US006940597B2

(12) United States Patent
Taylor et al.

(10) Patent No.: US 6,940,597 B2
(45) Date of Patent: Sep. 6, 2005

(54) METHOD FOR OBTAINING AN APPROXIMATE STANDARD COLOR DEFINITION FOR A SAMPLE COLOR

(75) Inventors: Celia Charlotte Taylor, Slough (GB); Peter Mark Spiers, Uxbridge (GB)

(73) Assignee: Imperial Chemical Industries PLC, London (GB)

( * ) Notice: Subject to any disclaimer, the term of this patent is extended or adjusted under 35 U.S.C. 154(b) by 211 days.

(21) Appl. No.: 10/310,087

(22) Filed: Dec. 5, 2002

(65) Prior Publication Data

US 2004/0032588 A1 Feb. 19, 2004

(51) Int. Cl.[7] ............................ G01N 21/25; G01J 3/52

(52) U.S. Cl. ........................ 356/405; 356/421; 356/402

(58) Field of Search ................................ 356/402, 405, 356/421, 422

(56) References Cited

U.S. PATENT DOCUMENTS 6,717,673 B1 * 4/2004 Janssen et al. .............. 356/402
6,717,674 B2 * 4/2004 Ohkubo ...................... 356/421
6,750,970 B2 * 6/2004 Masuda ...................... 356/402
6,788,412 B2 * 9/2004 Pfister ........................ 356/402

* cited by examiner

*Primary Examiner*—Layla Lauchman
(74) *Attorney, Agent, or Firm*—Morgan, Lewis & Bockius LLP

(57) ABSTRACT

A method for obtaining an approximate standard color definition for a sample color (2) without the need for standard conditions of illumination or observation. The method comprises using color sensing equipment such as a digital camera (6) to sense under non-standard conditions both the sample color and a plurality of reference colors (5) each being provided on a template (1) and each having a known standard color definition. The sensing under non-standard conditions produces a non-standard color definition both for the sample color and for each of the reference colors. The non-standard color definitions of reference colors near in color space to the sample color are compared with the known standard color definitions for the reference colors to obtain correction factors which are then applied to the non-standard color definition of the sample color to convert it to color definition which, though it is only an approximation of the standard color definition, is nevertheless sufficiently close to the true standard color definition to be useful in color matching.

4 Claims, 8 Drawing Sheets

METHOD FOR OBTAINING AN APPROXIMATE STANDARD COLOR DEFINITION FOR A SAMPLE COLOR

FIELD OF THE INVENTION

This invention relates to a method for obtaining an approximate standard colour definition for a sample colour without the need to employ standard conditions of illumination and observation.

DESCRIPTION OF RELATED ART

The standard definition of a sample colour requires the colour to be sensed under standard conditions of illumination and observation, but the creation of standard conditions is not practicable without the use of specialist lighting and quantitative colour sensing equipment employed in a specialist location such as laboratory or specialist trade store or specialist retail shop. It is not practicable to create standard conditions away from these locations, for example in domestic dwellings or ordinary commercial premises. However standard colour definitions obtained under standard conditions are very useful because they enable colours to be chosen or matched accurately from a large range of reference colours without the need for either highly skilled expert assistance or for the physical presence of samples of the reference colours.

The standard definition of colour is conventionally performed using one of two alternative techniques. In the first technique, a coloured surface is illuminated under standard conditions including the use of standard light from an internationally agreed standard light source. Light reflected from the surface is passed through three alternative filters and the light from each filter is measured and recorded by quantitative colour sensing equipment usually calibrated by reference to a standard white tile under standard conditions. Each filter mimics the sensitivity of one of the three types of cones present in the human retina and together they mimic the varying sensitivities of the eye to light of different wavelengths. The recorded amounts of light are each subjected to a well known mathematical process devised by the CIE (Comité International d'Eclairage) in order to adapt the uniform sensitivity of the optical instrument to accord with this non-uniform sensitivity of the human eye. The colour measurements obtained after adaptation by the mathematical process are expressed in the form one of alternative sets of three parameters such as the parameters known as the three CIE "XYZ" tristimulus co-ordinates or the equally well known CIE "L", "a" and "b" values. The set of three XYZ co-ordinates or the set of three L a b values give a meaningful definition of a colour provided that the colour is viewed under standard conditions including standard sensing equipment and illumination by light from a standard light source. A fuller description of the CIE XYZ Parameters and of the CIE L a b Parameters is given on Pages 95 to 112 of the second edition of the book "Colour Physics for Industry" edited by Roderick McDonald and published in 1977 by the Society of Dyers and Colourists of Bradford, England, the contents of which pages are herein incorporated by reference.

In the alternative technique for the standard definition of colour, quantitative measurements of light reflected from a standard source across a wide range of wavelengths are made using a standardised spectrophotometer and are then again subjected to a known mathematical process to adapt the measurements to take account of the nature of the light source and the non-uniform sensitivity of the human eye to light of different wavelengths. Again, the equipment is usually calibrated by reference to a standard white tile. The measurements obtained after adaptation by the mathematical process are expressed in CIE parameters as before.

Colour may also be sensed quantitatively by pixel generating equipment such as digital cameras or the scanners sold for use with personal computers. In the case of data from a digital camera or scanner, the mathematical process usually goes on to express and record the sensed amounts of colour in three parameters known as "R, G and B" values and it usually also goes on to produce signals which enable the sensed colour to be re-created on a cathode ray screen. The three "R", "G" and "B" values are also a set of three parameters capable of giving a meaningful definition of the colour provided that the colour is sensed under standard conditions.

If a specified model of digital camera is used under standard conditions including a specified position and a standard light source and if the equipment is suitably calibrated, the RGB values can also give a standard definition of a sample colour. A fuller description of RGB values is given in Chapter 10 of the third edition of the book "Measuring Colour" by RGW Hunt and published in 1998 by Fountain Press of Kingston upon Thames, England. The CIE XYZ co-ordinates, the CIE L a b values and the "RGB" values are all parameters expressing the same characteristics, so algorithms exist for translating from one to another. This allows standard colour definitions obtained in CIE parameters using a spectrophotometer to be translated into definitions based on RGB values and conversely standard colour definitions obtained in RGB values using pixel generating colour sensors can be translated into definitions based on CIE parameters. The ability to define all colours visible to the human eye by means of three parameters means that each colour can be located in a space defined by three mutually orthogonal axes where each axis represents one of the three parameters. This space is known as a "colour space". A fuller description of a colour space is given on Page iii of the "Colour Dimensions Colour Atlas" published in 1986 by Imperial Chemical Industries Plc of London. The contents of this Page iii are herein incorporated by reference. The existence of "colour spaces" means that it is possible to give a precise quantitative measure of the difference between two colours in terms of the distance between them in a particular colour space.

The term "standard colour space" will be used to denote a colour space defined with reference to parameters determined under standard conditions and the parameters determined under standard conditions will be denoted as "standard parameters". A definition of colour comprising only standard parameters will be denoted as the "standard colour definition" of a particular colour. Correspondingly, the term "non-standard colour space" will be used to denote a colour space defined with reference to parameters determined under particular non-standard conditions and these parameters will be denoted as "non-standard parameters". A definition of colour comprising non-standard parameters will be denoted as a "non-standard colour definition".

The CIE XYZ co-ordinates, the CIE L a b values and the RGB values are all quite complex and so non-experts and even many experts who are not colour scientists (such as architects or fashion designers) find them difficult to interpret. For this reason, various more user-friendly terms have been derived from the CIE L a b values which can still express the same colours precisely but in a format more intuitively understood by non-experts. The terms are:

1. "Lightness" which is a measure of how light or dark a colour is,
2. "Hue" which is a measure of how red, yellow, green or blue a colour is and
3. "Chroma" which is a measure of how intense a colour is, that is to say how far it is in standard colour space from the achromatic colour (ie. the grey colour) having the same lightness.

Using the CIE L a b values, the above three characteristics are defined as follows:

| | |
|---|---|
| Lightness = | L |
| Hue = | $\tan^{-1}$ b/a anticlockwise from horizontal where if b is negative, 180° are added to the angle |
| Chroma = | $\sqrt{(a^2+b^2)}$ ie the square root of $a^2 + b^2$ |

These definitions are meaningful, so lightness, hue and chroma are also three parameters which define a colour uniquely in standard colour space.

The human eye is capable of discerning over 8 million different shades of colour and probably at the very least 10 000 of these are available commercially in one or more of paints, varnishes, woodstains, wallcoverings, curtains, upholstery or other textiles, ceramics, flooring materials or other coloured materials used in buildings or their furnishings and especially in shops, stores, offices or domestic dwellings. A problem arises from the fact that even ordinary non-expert members of the public will notice quite small differences in colour and so it is most important that a colour be defined adequately accurately when it is being selected for a particular purpose. A few very highly skilled experts can judge colour accurately by eye but most ordinary experts need help from standard colour definitions if satisfactory choices or matches are to be made.

Ordinary experts and non-experts usually want to define a colour in order to be able to match it for replacement purposes or to reproduce it in another material. Hitherto, non-experts have had three ways to find a match which all involve some inconvenience. Firstly they could attempt to memorise a colour and then later re-visualise it in the hope that they would be able to find a match from memory. Clearly this is a hazardous method even for the ordinary expert and it is certainly hazardous for the non-expert causing them to experience an unacceptable level of dissatisfaction.

Secondly a sample of an existing colour could be taken to a specialist location where it would be matched by eye by an expert skilled in colour matching or else it would be sensed by a spectrophotometer to obtain the standard colour definition of the colour. This is doubly inconvenient partly because it is not always easy to obtain a sample when for example the sample has to be removed from a painted wall or a tiled floor and partly because it requires the sample to be taken to the specialist location such as a specialist store or shop.

Thirdly the ordinary expert or a non-expert could go to the supplier of the coloured materials and obtain a collection of test cards each depicting a colour similar to the one of interest. The cards would then be taken back to wherever the colour of interest may be where a best match would be found by eye. Again this is inconvenient because materials have to be transported between different locations and also hazardous because the final judgement has to be made by eye and frequently by someone with no specialist skills judging under non-standard illumination.

BRIEF SUMMARY OF THE INVENTION

It is an object of this invention to provide a method for obtaining an approximate but adequate standard colour definition of a sample colour as seen by the human eye which method avoids the need to create standard conditions in non-specialist locations such as domestic dwellings or ordinary commercial premises. The method is therefore more convenient for use by ordinary experts or by non-experts in homes or places of work. It is also an object of this invention to provide a means for communicating an approximate standard colour definition to a location remote from the original location of the sample colour.

Accordingly this invention provides a method (which will be called the "unsophisticated" method) for obtaining an approximate standard colour definition of a sample colour when the sample colour is sensed under conditions which are not standard which method includes the steps of a) selecting at least twenty reference colours each having a known standard colour definition comprising previously determined known standard parameters, b) storing the standard parameters of the reference colours in a database, c) providing a template having at least as many zones as there are reference colours and where each reference colour is depicted in at least one of the zones, d) placing the template adjacent the sample colour so that the sample colour and the reference colours on the template are all (usually simultaneously) visible, e) sensing the sample colour and the reference colours with quantitative colour sensing equipment under the non-standard conditions and obtaining non-standard parameters for both the sample colour and for the reference colours which non-standard parameters exist in a non-standard colour space, f) expressing the non-standard and standard definitions in parameters of a common type if they are not already expressed in parameters of a common type, g) selecting a near reference colour being a reference colour which is near (preferably nearest) to the sample colour in the non-standard colour space, h) subtracting each standard parameter in the standard definition of the selected near reference colour from its corresponding non-standard parameter so as to obtain the numerical difference between the parameters of a pair of corresponding non-standard and standard parameters, which difference may be positive or negative and i) subtracting the numerical differences from the corresponding parameters of the non-standard colour definition of the sample colour whereby subtraction of the numerical differences from the corresponding parameters of the non-standard colour definition of the sample colour converts the non-standard definition into an approximate standard colour definition for the sample colour. "Corresponding parameters" are parameters which define the same characteristic but for different colours. For example, if one colour has an L value of $L_1$, another has an L value of $L_2$ whilst a third has an L value of $L_3$, then for the purposes of this specification, $L_1$, $L_2$ and $L_3$ are "corresponding parameters".

DETAILED DESCRIPTION OF THE INVENTION

The unsophisticated method is convenient for ordinary experts and non-experts to use because it can be performed under the local non-standard conditions. In addition the method can be performed with readily available instruments and especially relatively cheap pixel generating quantitative colour sensing equipment such as digital cameras or scanners. Further, the programmes needed to store the databases and manipulate the parameters can be easily performed using a personal computer. It has been found that even when as few as twenty reference colours are employed, the approximate standard colour definitions obtained are sufficiently accurate to allow colours to be chosen by a non-expert with a tolerable level of satisfaction. The approximate standard colour definition may be transmitted electronically to a trade store, retail shop or other location remote from the sample colour and goods of that colour may dispatched without any need of a visit to the remote location.

The approximation can be improved (ie. made less approximate) by using a greater number of reference colours. For this reason, it is preferred to use at least 50 reference colours and 50 to 300 are preferred. Preferably a zone of reference colour should be from 70 to 120 mm square. The improved approximation is of value to many ordinary such as architects or fashion designers but who expect high standards when colours are being matched.

Known reference colours can be easily selected from one of many collections of colours where each colour has been sensed quantitatively in the laboratory under standard conditions to obtain its standard parameters and hence its standard colour definition. The standard colour definition may be expressed meaningfully using conventional parameters such as those provided by the CIE XYZ co-ordinates, the CIE L a b values, the RGB values.

The selection of known reference colours should be representative of the range of hues around the hue circle. A good illustration of the hue circle is given on Page v of the "Colour Dimensions Colour Atlas". Satisfactory representation of the colours generally requires that the selected reference colours be about equally spaced around the hue circle except that better approximations are obtained if the representation of the colours is unequal to the extent that the yellow portion of the hue circle is represented by a few more reference colours than each of the other portions.

When the selection of the known reference colours has been made, the standard parameters comprising the standard colour definition of each selected reference colour should be compiled into a database which is preferably then made accessible from a personal computer.

Each of the selected reference colours is depicted on the front surface of the template which preferably comprises parallel opposed front and reverse flat surfaces. Preferably the template comprises a sheet of card or a sheet of metal primed to receive a coloured coating material such as an ink or paint (including laquers). Each reference colour is depicted alone in at least one of a plurality of spaced or contiguous zones of the front surface of the template. The non-standard conditions of illumination will usually be natural daylight or electric light. The reverse surface of the template is preferably placed against the sample colour whereupon the reference colours and the sample colour adjacent the template are sensed quantitatively and preferably simultaneously by appropriate colour sensitive equipment which generates data from which non-standard parameters for both the sample colour and the reference colours can be obtained. Usually these non-standard parameters will be stored in a database. The sample colour may be sensed at an edge of the template, but preferably it is sensed through an aperture in the template so as to control the area of sample colour available for sensing.

Preferred quantitative colour sensing equipment is pixel-generating such as a digital camera or a scanner which means that it is convenient for the non-standard colour definitions to be obtained in RGB values although a subsequent translation into a CIE parameters may be made if CIE parameters are preferred.

The approximate standard colour definitions of sample colours obtained using the unsophisticated method enable non-experts to choose or match colours with greater satisfaction. However, it has been discovered that the approximate standard colour definitions can be improved by making certain preliminary partial corrections derived from the way in which achromtic colours behave under differing conditions of illumination. The corrections produce what may be called "achromatic adjustments" of non-standard parameters and their use will now be explained.

An achromatic adjustment makes use of the fact that a colour which is achromatic (ie. grey, white or black) when observed under standard conditions will of course (like any other colour) undergo a change in appearance when observed under non-standard conditions. Generally, an achromatic colour will undergo a change in its lightness and also acquire a chromatic component. More precisely and using CIE values, a colour which is achromatic under standard conditions will have a lightness or "L" value but zero "a" and "b" values. When conditions become non-standard, the "L" value will change and non-zero "a" and "b" values will appear. Likewise, changes in R, G and B values will similarly occur and for convenience these changes will be called "δR", "δG" and "δB". Most significantly, it has also been discovered that there is a reasonably linear relationship between these changes (δR, δG and δB) and the size of the R, G and B parameters in a non-standard colour definition. As explained below, this relationship can be determined using three or more achromatic reference colours and then used to provide achromatic adjustments to the non-standard parameters relating to all the colours on the template including the chromatic colours and also the sample colour resulting in an improved approximate standard colour definition for a sample colour when unsophisticated method is used.

The linear relationships can be expressed by the following equations which can be illustrated as linear graphs of which FIG. 1 of the drawings which accompany this Specification is one such possible graph:

$$\delta R = m_R R_{ns} + c_R$$

$$\delta G = m_G G_{ns} + c_G$$

$$\delta B = m_B B_{ns} + c_B$$

where $m_R$, $m_G$ and $m_B$ are constants representable as the gradients of graphs and $c_R$, $c_G$ and $c_B$ are also constants derivable from the graphs.

The values for δR, δG and δB obtainable from the linear relationships can then be subtracted from non-standard parameters of colours which are chromatic under standard conditions to provide achromatically adjusted parameters which can then used in the performance of the unsophisticated method to give an improved approximate standard colour definition.

The linear relationship has been demonstrated using RGB values, but it is presumed that it could equally well be demonstrated using CIE parameters.

It is preferred to use at least four achromatic reference colours when establishing the linear relationships needed to provide achromatic adjustments.

The unsophisticated method assumes that, if the near reference colour is sufficiently near to the sample colour in colour space, then the numerical differences obtained for the near reference colour can be safely subtracted from the non-standard parameters of the sample colour to create an approximate standard definition with the introduction of no more than minor errors. However, even when achromatically adjusted non-standard parameters are used in the unsophisticated method, this assumption begins to fail and the errors become less minor as the distance of a reference colour in non-standard colour space from the sample colour increases. This is especially true for colours of a yellowish hue as is explained by the following commentary made with reference to FIG. 2 of the drawings which accompany this Specification.

FIG. 2 illustrates how the numerical differences between standard L a b values and the non-standard L a b values vary around the hue circle. In the CIE L a b system, the hue circle starts with red at 0° and goes anticlockwise via yellow (90°), green (180°) and blue (270°) back to red at 360° or 0°. It will be seen from FIG. 2 how the size of the negative numerical differences for the "a" parameters increases substantially between 25° (orange) and 100° (slightly greenish yellow) which indicates that the unsophisticated method is at its best for greens and blues. The "b" parameters show a similar, but less extreme variation. The "L" parameter is reasonably constant.

This invention also provides further modifications devised to estimate and compensate for the change in minor errors mentioned above and the method is especially worthwhile for use with yellowish hues and also when the distance in non-standard colour space of the reference colours from the sample colour increases. One such modification will be called the "single triangle modification". The single triangle modification provides a method which in common with the unsophisticated method the steps of a) selecting at least twenty reference colours each having a known standard colour definition comprising previously determined known standard parameters, b) storing the standard parameters of the reference colours in a database, c) providing a template having at least as many zones as there are reference colours and where each reference colour is depicted in at least one of the zones, d) placing the template adjacent the sample colour so that the sample colour and the reference colours on the template are all (usually simultaneously) visible, e) sensing the sample colour and the reference colours with quantitative colour sensing equipment under the non-standard conditions and obtaining non-standard parameters for both the sample colour and for the reference colours which non-standard parameters exist in non-standard colour space, f) expressing the non-standard and standard definitions in parameters of a common type if they are not already expressed in parameters of a common type, g) selecting a near reference colour being a reference colour which is near (preferably nearest) to the sample colour in the non-standard colour space, but wherein the method is modified by specifying "L", "a" and "b" values as the parameters for use in step f) and replacing steps h) and i) of the unsophisticated method by the steps of h) providing on the template a plurality of groups of at least three reference colours (and preferably eight reference colours) wherein each colour in a group has a similar standard hue (preferably similar to the extent of having a hue angle differing by no more than ±10° from that of any other colour in the group) and which under standard conditions differs from other colours in the group in at least one of lightness and chroma, i) selecting at least one couple of other reference colours from the group which contains the near reference colour and using the couple in combination with the near colour to serve as three corner colours which define one triangle in non-standard colour space (see FIG. 5), j) identifying any such triangles as are created in step i) above which encompass the sample colour in non-standard colour space and selecting the smallest in area of these encompassing triangles if there is more than one, k) taking in turn each non-standard L, a and b value (which will be called $L_{ns}$, $a_{ns}$ and $b_{ns}$, respectively and generically the parameters will be called $P_{ns}$) relating to a corner colour and subtracting from each $P_{ns}$ the corresponding standard parameter $P_{sc}$ of the corner colour so as to obtain the difference $P_{ns}-P_{sc}$ which will be called $\delta P$ generically, or $\delta L$, $\delta a$ or $\delta b$ specifically, l) notionally creating a two-dimensional non-standard cartesian space defined by
   i) an axis which is non-standard chroma which will be called $C_{ns}$ and
   ii) an axis which is non-standard lightness which will be called $L_{ns}$ and is orthogonal to the $C_{ns}$ axis, m) notionally plotting for each corner colour its $C_{ns}$ and its $L_{ns}$ in the cartesian space so as to create a triangle (see in FIG. 6), n) notionally converting the cartesian space into a three dimensional space by adding a third orthogonal axis which is a $\delta L$ axis, o) plotting the appropriate $\delta L$ to each $L_{ns}$ to create three points which define a plane in the space which will be almost always inclined to the triangle created in step m) (see FIG. 7), p) notionally plotting the non-standard chroma $C_{sns}$ of the sample colour and its lightness value $L_{sns}$ in the cartesian space of step l), q) determining the distance (which will be called $\delta L_s$) from the point plotted in step p) to the plane in a direction parallel to the $\delta L$ axis and r) twice repeating steps m) to q), using in the first repetition "$\delta a$" parameters instead of the "$\delta L$" parameters (see FIG. 8) and in the second repetition "$\delta b$" parameters instead of the "$\delta L$" parameters (see FIG. 9)

whereby the numerical differences $L_{sns}-\delta L_s$, $a_{sns}-\delta a_s$, and $b_{sns}-\delta b_s$, convert the non-standard parameters of the sample colour to approximate standard parameters which together create an approximate standard colour definition for the sample colour.

The approximate definition obtained using the method incorporating the single triangle modification results in an improved approximation than the definition obtained using the unmodified unsophisticated method. The modified method can be further refined by using achromatically adjusted non-standard definitions and their non-standard parameters instead of the unadjusted definitions and parameters employed above.

Another improvement in the quality of the approximation can be achieved by performing a method which incorporates a third modification which will be called the "double triangle modification". Essentially the method involves a simultaneous duplicate performance of the method incorporating the single triangle modification. One performance selects its near colour from only those colours whose non-standard hue angle ($\tan^{-1}\,{}^{b}/a$) is less than that of the sample colour whilst the other selects its near colour from only those colours whose non-standard hue angle is greater than that of the sample colour. Such a duplicate performance of course produces two approximate standard definitions of the sample colour, each having its own approximate standard parameters $P_{as}$. To obtain the further improvement of these approximate standard parameters $P_{as}$, the two $\delta$Ps relating to each pair of the corresponding approximate standard parameters is notionally plotted in the appropriate one of three two dimensional areas defined by a $\delta P$ axis and a hue axis to give a line which is nearly always inclined to the hue axis, (see FIGS. 10 to 12). The value of $\delta P$ given by this line at the non-standard hue of the sample is subtracted from the corresponding non-standard L,a or b value of sample 2 to give the further improved approximation for these values. The three further improved parameters obtained in this way together provide a further improved approximate standard colour definition for the sample colour.

This invention also provides a method incorporating a fourth modification which will be referred to as the "polyhedral" method. It enables the method to advantage of a much larger number of known colours than are provided as reference colours on the template.

The method has steps a to g in common with the unsophisticated method but it is modified by including the storage in a database of a number of additional known colours not present on the template but whose standard colour definitions are known having been predetermined and by the replacement of steps h) and i) by the steps of h) determining which groups of at least four (and preferably up to six) of the reference colours which, when serving as corner colours, define in the non-standard colour space the corners of polyhedra which encompass the sample colour, i) selecting that group of reference colours which defines the smallest in volume of the encompassing polyhedra, j) for each reference colour defining a corner of the smallest polyhedron, using the unsophisticated method to determine the numerical differences (preferably expressed in L a b parameters) between non-standard and standard parameters, k) adding in turn the lowest and the highest of the numerical differences determined in step (j) above to the corresponding parameters of the non-standard colour definition of the sample colour thereby obtaining a pair values for each parameter whereupon a notional straight line extends between each pair and these three notional lines define a box in non-standard colour space and l) selecting as the approximate standard colour definition of the sample colour, the standard colour definition of a reference colour or an additional known colour found to be encompassed within the box and where more than one reference colour is so encompassed, choosing by eye which reference colour offers the best approximation.

In practice, if sufficient numbers (preferably 4 to 9) of groups of reference colours are used, it is unusual for more than one reference or known colour to be found to be encompassed by the box and so a final selection by eye is seldom needed.

BRIEF DESCRIPTION OF THE DRAWINGS

Specific embodiments of the invention will now be illustrated by Examples 1 to 5 and by reference to the drawings of which

EXAMPLE 1

Figure 3:
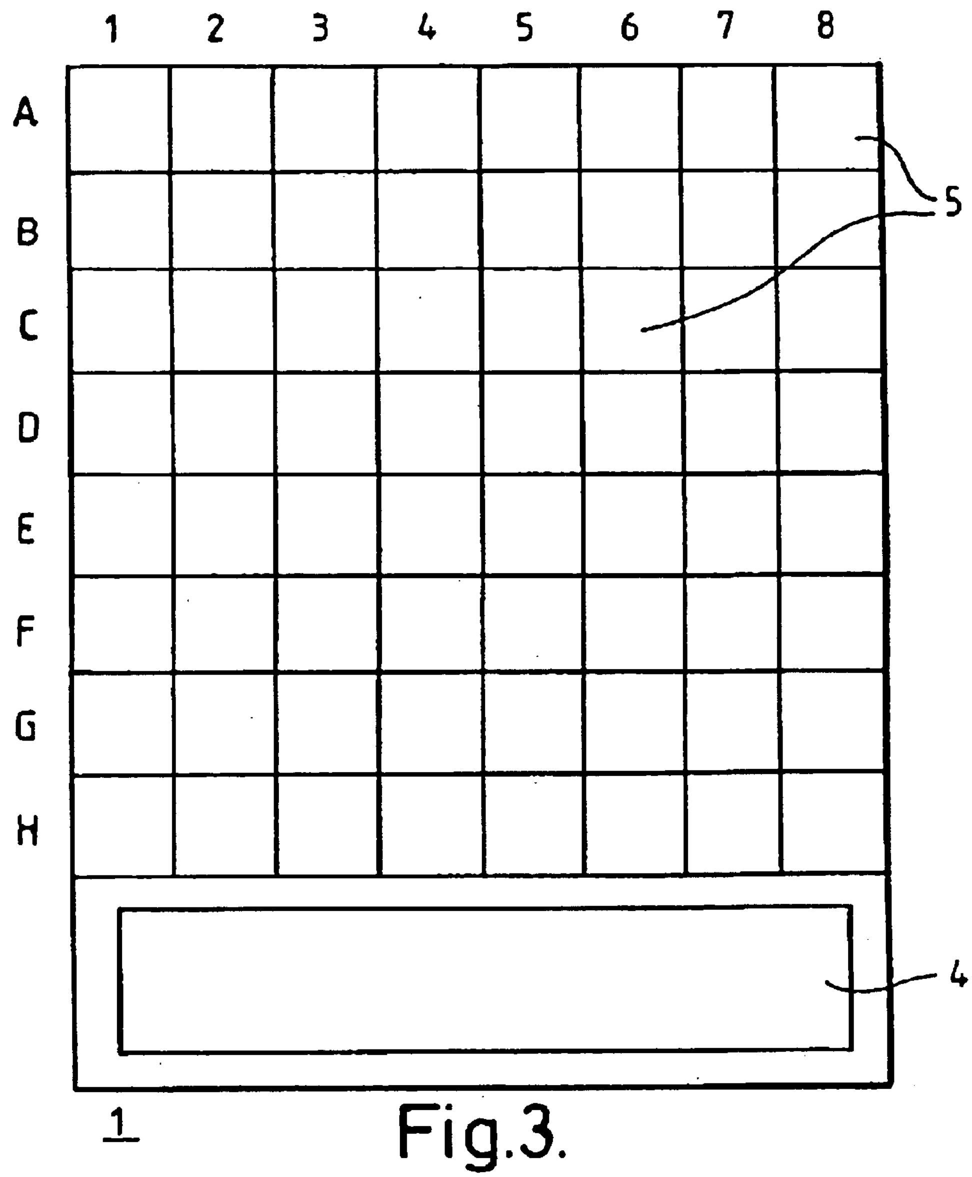
FIG. 3 is a plan view of a template.
Figure 4:
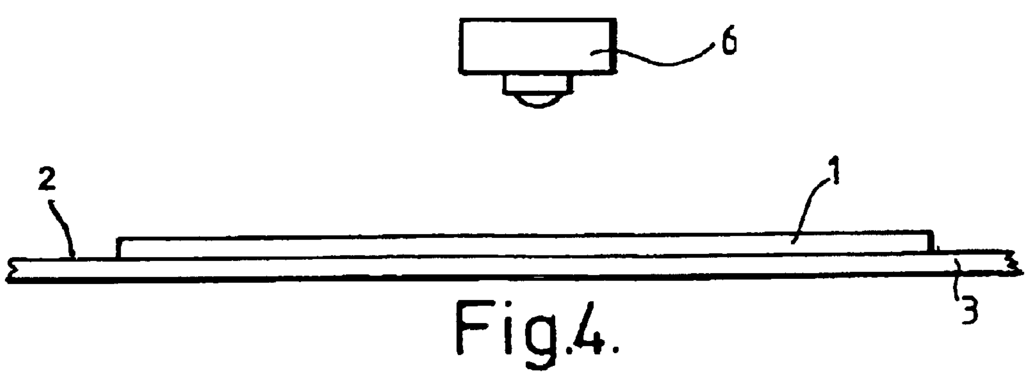
FIG. 4 is an end elevation of the template on a colour sample.

Unsophisticated Method:

An approximate standard colour definition for a pale blue sample colour was determined by first placing a template 1 as shown in FIG. 3 on a pale blue sample colour 2 composed of a dried coat of paint as shown in FIG. 4 carried on a cardboard substrate 3 so that the sample colour 2 was visible through aperture 4 in template 1. Sample colour 2 was illuminated by natural daylight which meant that the sample was exposed to non-standard conditions.

Template 1 comprises 64 reference colours each having a known standard definition comprising previously determined and so known standard parameters stored in a database in a computer, (not shown). Each colour is displayed in one of 64 contiguous zones 5 arranged in an 8×8 matrix comprising columns 1 to 8 and rows A to H. The standard colour definitions of the reference colours are expressed in terms of both CIE L a b and RGB parameters and no two reference colours are the same. Each reference colour in a particular column has a hue angle (i.e. $\tan^{-1}\,{}^{b}/a$) of within ±10° of the hue angle of the other reference colours in that column but as a column is descended, its colours vary in lightness and chroma. Expressed in CIE L a b parameters (i.e. $\tan^{-1}\,{}^{b}/a$), the hues selected for each column were as follows:

| | | | |
|---|---|---|---|
| A = $\alpha$ | B = $\beta$ | C = $\zeta$ | D = $\delta$ |
| E = $\epsilon$ | F = $\theta$ | G = $\gamma$ | H = $\eta$ |

Again expressed in CIE L a b values, the reference colours selected for zones 5 were as shown in Table 1.

TABLE 1

| | | | | | | | |
|---|---|---|---|---|---|---|---|
| A1 | A2 | A3 | A4 | A5 | A6 | A7 | A8 |
| B1 | B2 | B3 | B4 | B5 | B6 | B7 | B8 |
| C1 | C2 | C3 | C4 | C5 | C6 | C7 | C8 |

TABLE 1-continued

| | | | | | | | |
|---|---|---|---|---|---|---|---|
| D1 | D2 | D3 | D4 | D5 | D6 | D7 | D8 |
| E1 | E2 | E3 | E4 | E5 | E6 | E7 | E8 |
| F1 | F2 | F3 | F4 | F5 | F6 | F7 | F8 |
| G1 | G2 | G3 | G4 | G5 | G6 | G7 | G8 |
| H1 | H2 | H3 | H4 | H5 | H6 | H7 | H8 |

Once template 1 has been placed on sample colour 2, each test colour on template 1 and sample colour 2 are sensed by digital camera 6, with sample colour 2 being sensed through aperture 4. Camera 6 gave non-standard RGB parameters for each of the reference colours. The non-standard parameters of the reference colours were compared with those of the sample colour and a reference colour, say C3, was found to be the nearest in non-standard colour space to sample colour 2.

The non-standard parameters of reference colour C3 determined by camera 6 when used in combination comprise its non-standard colour definition and they were subtracted from the corresponding parameters in the standard test colour definition of colour C3 to obtain the numerical differences between the corresponding parameters of the non-standard and standard colour definitions. These numerical differences will be referred to as δR, δG and δ B and were found to be $$R_s - R_n = \delta R = +\rho$$

Where s and n denote standard $$G_s - G_n \delta G = +\sigma$$

and non-standard $$B_s - B_n = \delta B = +\tau$$

parameters respectively.

The numerical differences were then subtracted from the corresponding parameters of the non-standard colour definition of the sample colour which parameters were:

$$R=RRR,\ G=GGG \text{ and } B=BBB$$

Subtracting the the numerical differences from the corresponding non-standard parameters converts them to an approximate standard colour definition for the sample colour which is $$R_a = RRR - \rho;\ G_a = GGG - \sigma;\ B_a = BBB - \tau$$

where "a" denotes a parameter of the approximate standard colour definition.

EXAMPLE 2

Application of an Achromatic Adjustment to the Unsophisticated Method:

The procedure of Example 1 was adopted but with the following modifications.

The template used in Example 1 was replaced by a partially achromatic template carrying 100 reference colours each having known standard parameters stored in the database. The template was partially achromatic in that 20 of its reference colours were achromatic under standard conditions.

The template was placed on sample colour 2 and its achromatic reference colours were sensed by camera 6. The use of natural daylight instead of standard illumination caused a shift in the lightness of the achromatic colours and also caused them to gain a chromatic components. The four achromatic colours nearest sample colour 2 in non-standard colour space were chosen and their change in RGB values (ie. δR, δG and δG repectively) were plotted against their newly gained non-standard RGB values each in the appropriate one of three cartesian colour spaces defined by mutually perpendicular axes which were:

First area: δR against non-standard "R" values,

Second area: δG against non-standard "G" values,

Third area: δB against non-standard "B" values.

Figure 1:
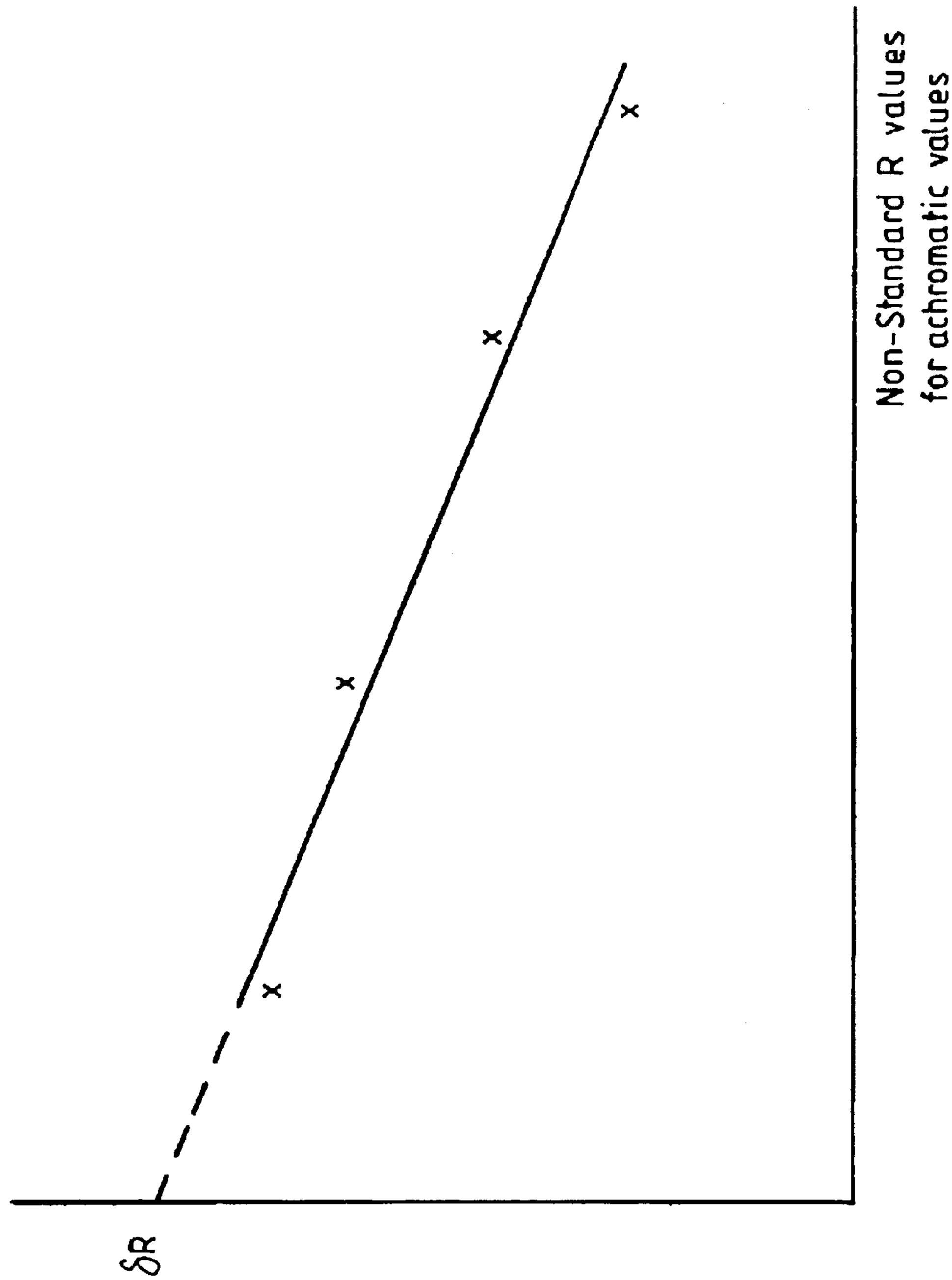
FIG. 1 is a graph illustrating the shift in the size of R values which occurs when an achromatic colour is observed under non-standard conditions.
Figure 2:
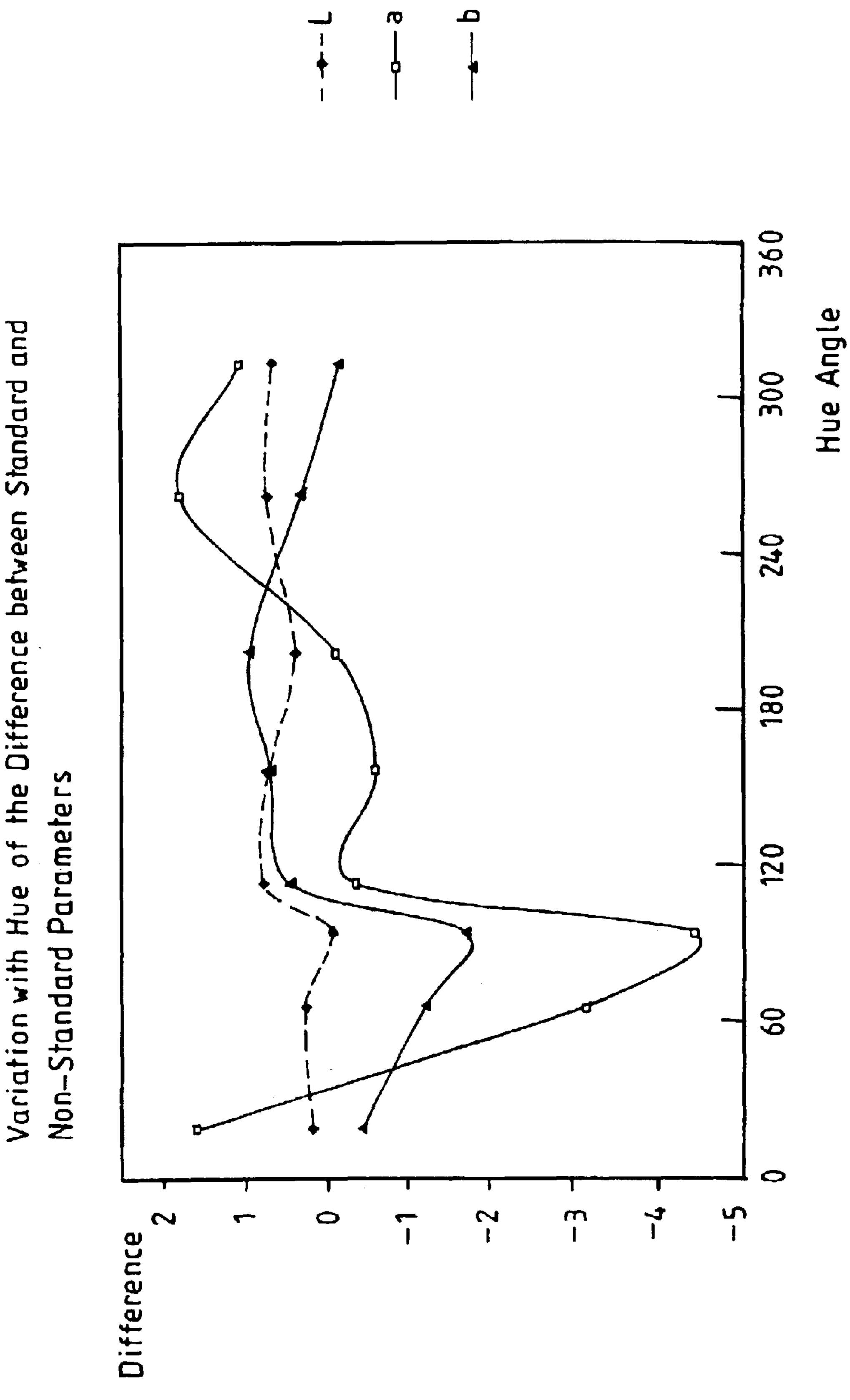
FIG. 2 is a graph of numerical differences in L, a and b parameters as determined by the "unsophisticated" method against hue angle to show how the differences vary with hue.

The plots produced reasonably linear graphs as is illustrated by the graph for "δR" values shown in FIG. 1 of the drawings. This allowed the change in the three parameters to be calculated using the equation:

$$\delta P_{adj} = mP_{ns} + c$$

where $\delta P_{adj}$ is an achromatically adjusted RGB value, $P_{ns}$ is a non-standard RGB value and m and c are constants.

The unsophisticated method of Example 1 was then performed using chromatic reference colours but the non-standard parameters, $P_{ns}$, obtained for the reference colours were adjusted by subtracting the $\delta P_{adj}$ as calculated above to each non-standard parameter before the parameter was used to determine the numerical difference to be added to the non-standard parameter of the sample colour. The approximate standard colour definition then obtained from the unsophisticated method was a better approximation than would have been obtained without the achromatic adjustment.

EXAMPLE 3

Method Incorporating the Triangle Modification:

As in Example 1, template 1 was placed against colour sample 2, illuminated by natural daylight and its reference colours and colour sample 2 were sensed by camera 6 to obtain their non-standard parameters which in this Example were expressed in CIE L a b values. The colours on template 1 are again arranged in eight groups of eight and each colour in a group has a hue angle under standard conditions which is ±10° of the hue angle of any other colour in the group.

Figure 5:
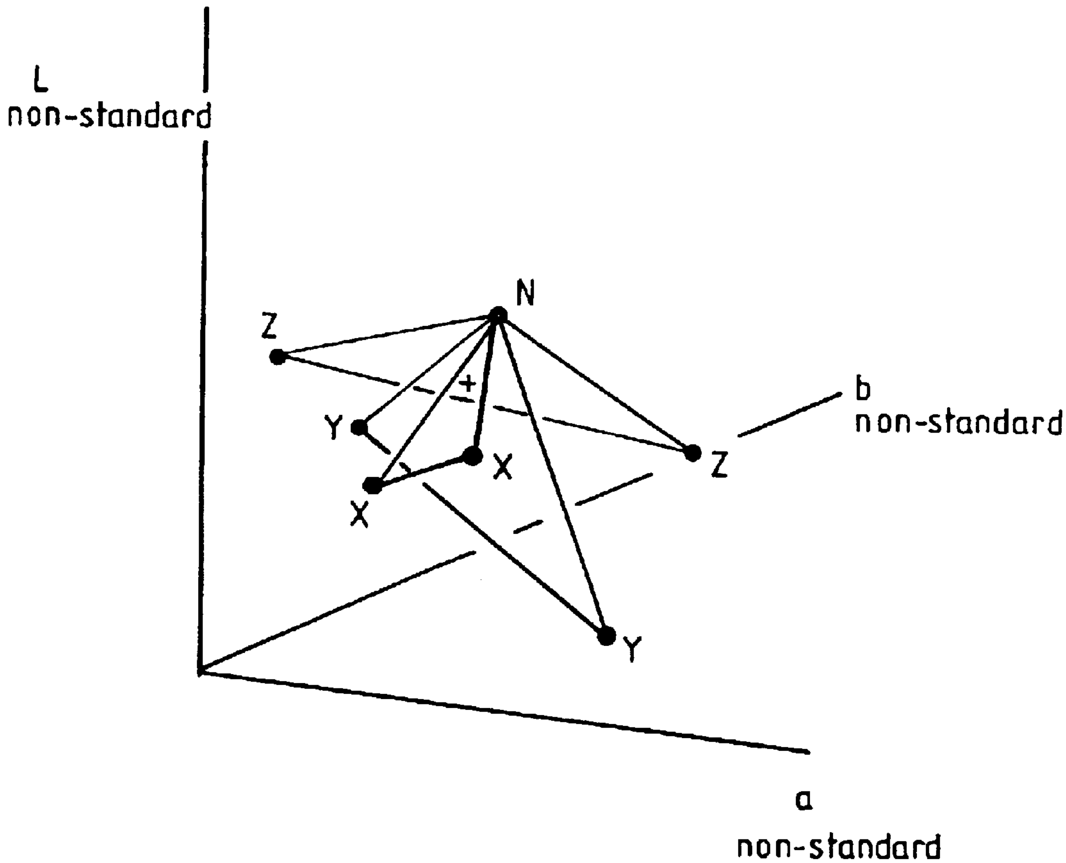
FIG. 5 is a graph showing in perspective the positions of corner colours in non-standard colour space.

The reference colour nearest to sample colour 2 in non-standard colour space was identified and then other colours in the same group were taken in turn in couples and used in combination with the nearest colour to form a triplet of corner colours which defined a triangle in non-standard colour space. Triangles which encompassed sample colour 2 were identified and the smallest of them selected for the next steps. FIG. 5 shows sample colour 2 indicated by "+" encompassed within three triangles defined by corner colours comprising nearest colour N and couples of other colours from the same group indicated by X, Y and Z. Triangle NXX is the smallest.

Each standard L, a or b value (to be called $P_{SS}$ generically) of a corner colour of the smallest triangle was subtracted from its corresponding non-standard L a b value to give a difference which will be called δL, δa or δb.

Figure 6:
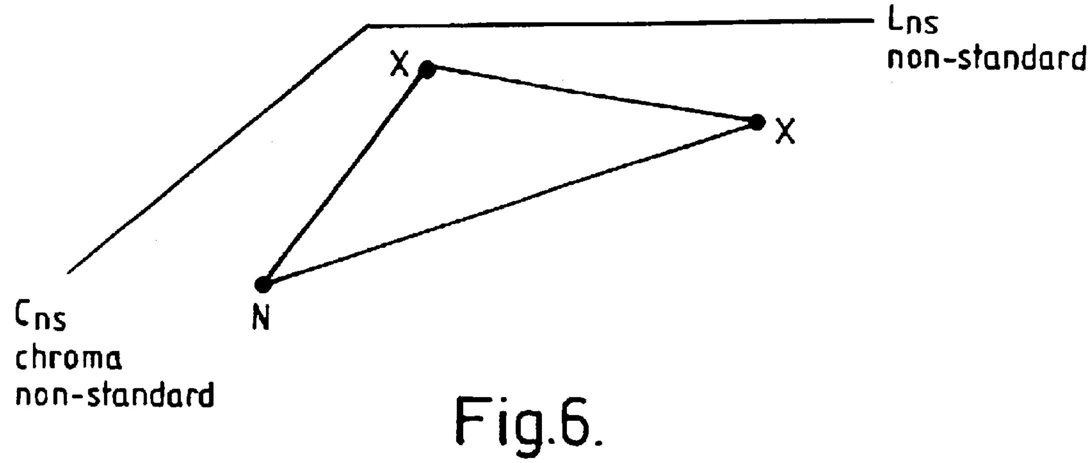
FIG. 6 is a graph of showing in perspective the positions of corner colours.
Figure 7:
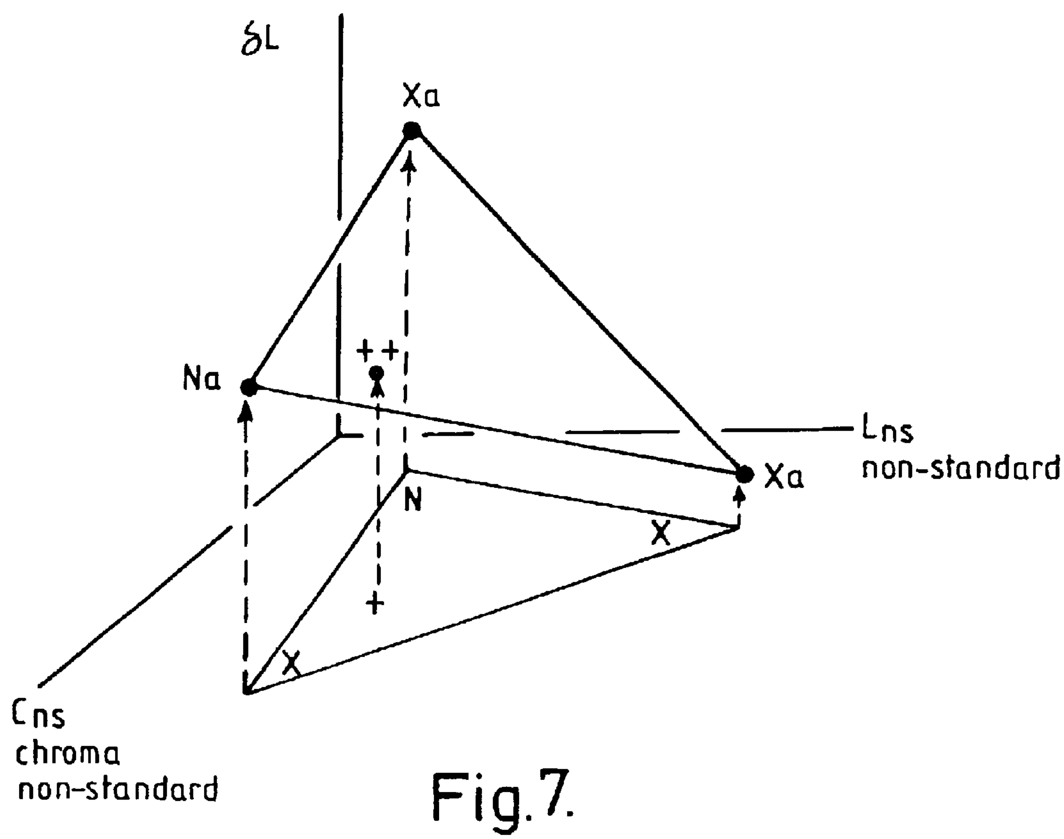
FIG. 7 is a graph of showing in perspective the positions of "L" values and improved L values for corner colours.
Figure 8:
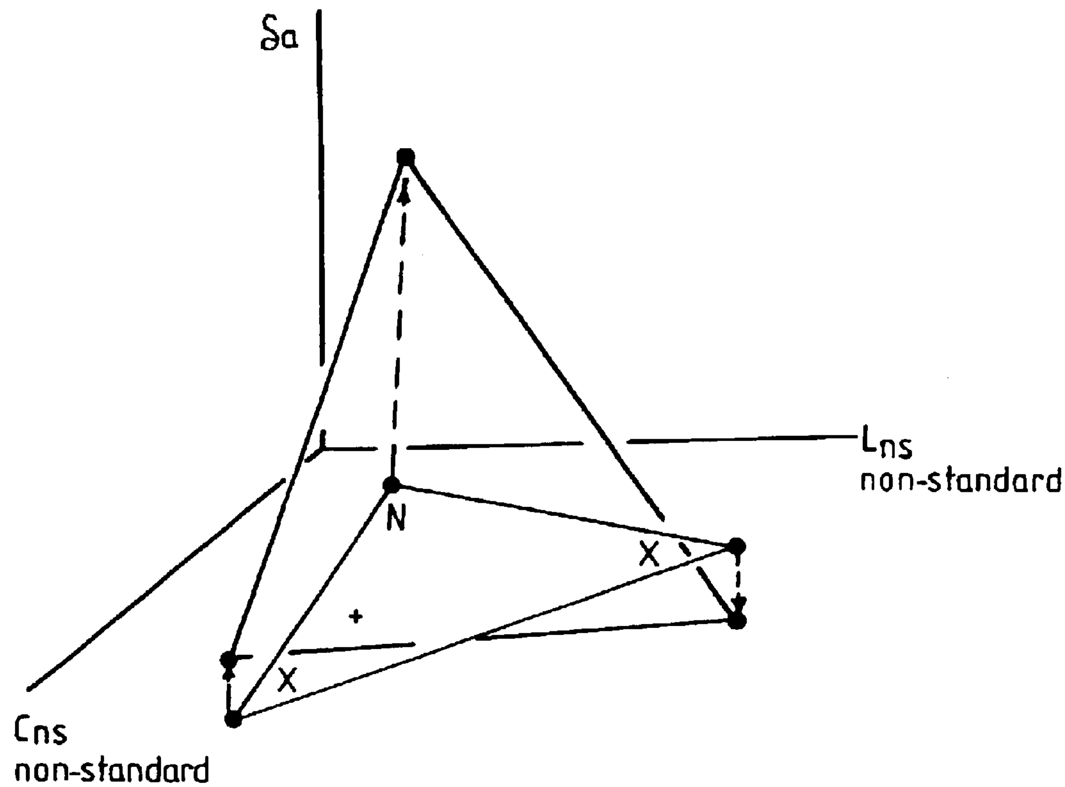
FIG. 8 is a graph of showing in perspective the positions of "a" values and improved "a" values for corner colours.

A two-dimensional non-standard cartesian space was created which is shown in perspective in FIGS. 6 to 8. The space is defined by mutually orthogonal axes, one of which is non-standard chroma (ie. $\sqrt{(a^2+b^2)}$ or "$C_{ns}$") and the other is non-standard lightness or "$L_{ns}$".

Figure 9:
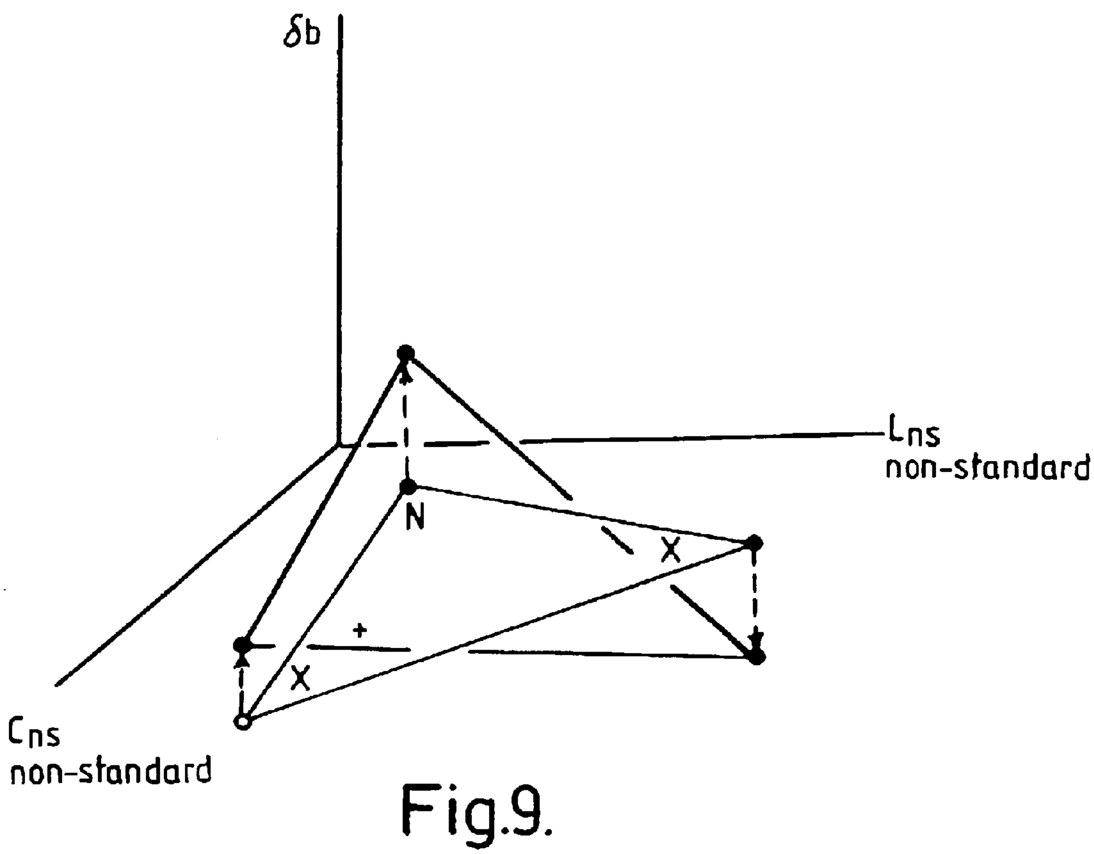
FIG. 9 is a graph of showing in perspective the positions of "b" values and improved "b" values for corner colours.

The cartesian space is then converted to three alternative spaces by adding a third mutually orthogonal axis selected in turn from δL (see FIG. 7), δa (see FIG. 8) or δb (see FIG. 9). The appropriate δL, δa or δb is subtracted from the parameters of the corner colours to produce three points, $N_a$, $X_a$ and $X_a$, in each space which define a triangular plane inclined to the triangle NXX. The appropriate non-standard parameter of sample colour 2 is plotted in each of the spaces as indicated by "+" in FIGS. 7 to 9 and the vertical extrapolation of the plot intersects the plane at a point indicated by "++". This point gave an improved approximate standard parameter for sample colour 2 and together the improved L, a and b parameters comprise an improved standard colour definition for sample colour 2.

EXAMPLE 4

Figure 10:
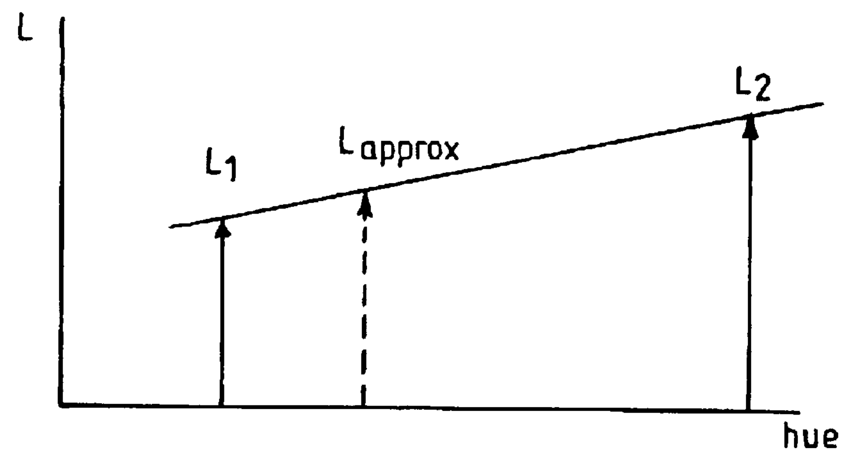
FIG. 10 is a graph of approximate "L" values versus hue.
Figure 11:
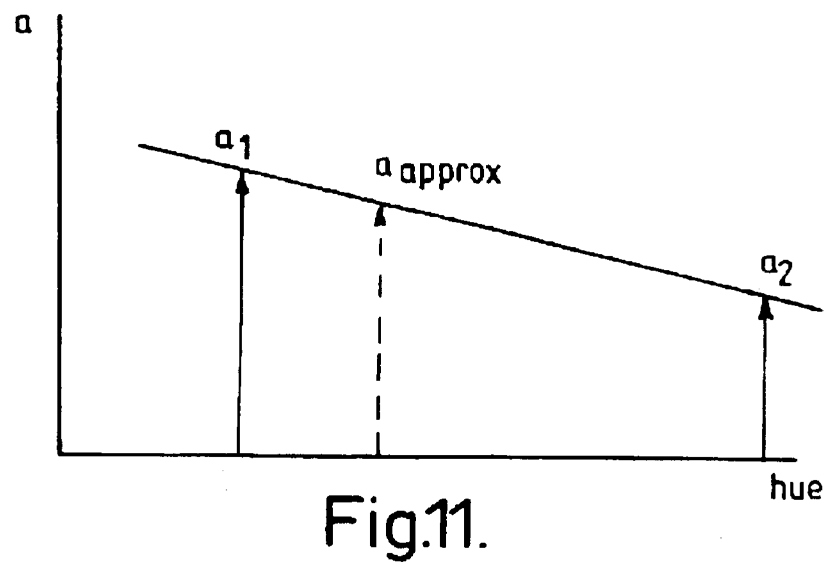
FIG. 11 is a graph of approximate "a" values versus hue.
Figure 12:
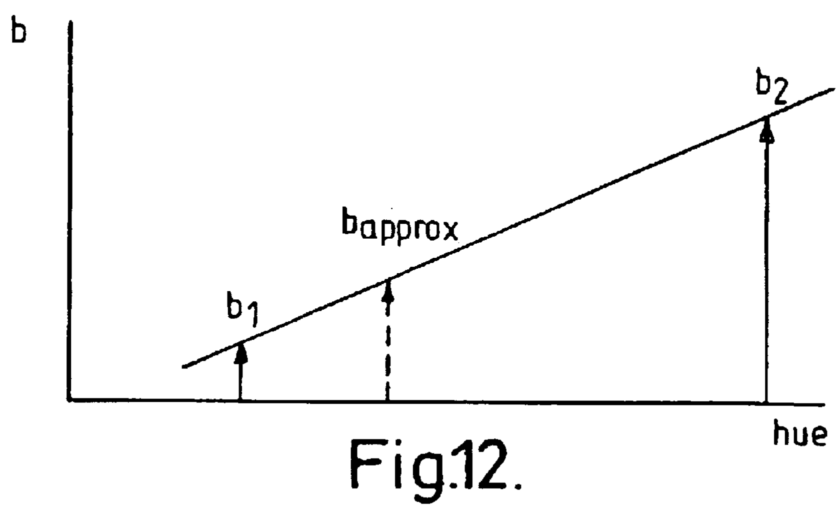
FIG. 12 is a graph of approximate "b" values versus hue.

Method Incorporating the Double Triangle Modification:

The method of Example 3 was performed twice. In the first performance, the nearest colour was selected only from groups of colours whose hue angle was less than that of sample colour 2 whilst in the second performance, it was selected from only those colours whose hue angle was greater than that of sample colour 2. Two improved approximate colour definitions of sample colour 2 were therefore obtained and their L a b parameters will be called respectively $L_1$, $a_1$ and $b_1$ for the first and $L_2$, $a_2$, and $b_2$. These values were in turn plotted against non-standard hue and the pairs of points were joined by a line which was inclined to the hue axis as is illustrated for the appropriate values by FIGS. 10 to 12. The value on the line at the non-standard hue of sample colour 2 was taken as the further improved value for the particular parameter. The further improved values for the three parameters comprise the further improved approximation of the standard colour definition of sample colour 2.

EXAMPLE 5

Method Incorporating the Polyhedral Modification:

The method of Example 1 was repeated to the extent that a template 1 was placed on sample colour 2 and the reference colours on the template and the sample colour were illuminated by natural daylight and were sensed by camera 6. However, the standard parameters 300 additional known colours different from those on the template were stored in a database in the computer.

Figure 13:
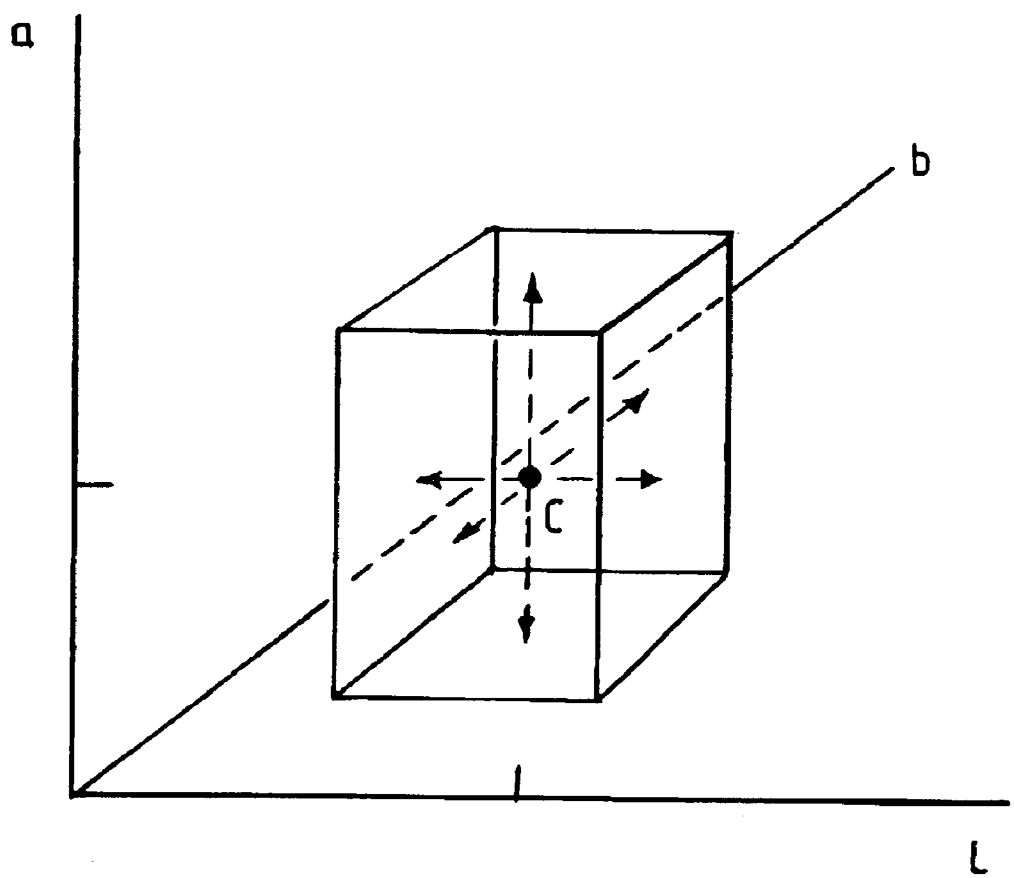
FIG. 13 is a triaxial graph shown in perspective and having "L", "a" and "b" axes.

The four reference colours which defined the smallest tetrahedron which encompassed the sample colour in non-standard colour space were identified and their positions in non-standard colour space were expressed in CIE L a b parameters. The unsophisticated method of Example 1 was used to determine the numerical differences as determined in Example 1 for each of the three parameters of the four identified reference colours. The highest and lowest of these differences for each parameter were adopted and subtracted from the corresponding non-standard parameters of the sample colour. The highest and lowest of these parameters define a line which can be represented on a triaxial graph as shown in FIG. 13. The three lines corresponding to the three parameters define a box again as shown in FIG. 13 which encompasses the position of sample colour 2 marked as "C" in FIG. 13. It was found that the box shown in FIG. 13 encompassed the position of just one colour belonging to the stored collection of reference colours and additional known colours. The standard colour definition of that encompassed colour was adopted as the approximate standard colour definition of the sample colour.

What is claimed is:

1. A method for obtaining an approximate standard colour definition of a sample colour (2) when the sample colour is sensed under conditions which are not standard which method includes the steps of a) selecting at least twenty reference colours each having a known standard colour definition comprising previously determined known standard parameters, b) storing the standard parameters of the reference colours in a database, c) providing a template (1) having at least as many zones (5) as there are reference colours and where each reference colour is depicted in at least one of the zones, d) placing the template adjacent the sample colour so that the sample colour and the reference colours on the template are all visible, e) sensing the sample colour and the reference colours with quantitative colour sensing equipment (6) under conditions which are not standard and obtaining non-standard parameters for both the sample colour and for the reference colours which non-standard parameters exist in a non-standard colour space, f) expressing th non-standard and standard definitions in parameters of a common type if the are not already expressed in parameters of a common type, g) selecting a near reference colour being a reference colour which is near to the sample colour in the non-standard colour space, h) subtracting each standard parameter in the standard definition of the selected near reference colour from its corresponding non-standard parameter so as to obtain a numerical difference between the parameters of a pair of corresponding non-standard and standard parameters, which difference may be positive or negative and i) subtracting the numerical difference from the corresponding parameters of the non-standard colour definition of the sample colour whereby subtraction of the numerical differences from the corresponding parameters of the non-standard colour definition of the sample colour converts the non-standard definition into an approximate standard colour definition for the sample colour.

2. A method for obtaining an approximate standard colour definition of a sample colour (2) when the sample colour is sensed under conditions which are not standard which method includes the steps of a) selecting at least twenty reference colours each having a known standard colour definition comprising previously determined known standard parameters;

b) storing the standard parameters of the reference colours in a database, c) providing a template (1) having at least as many zones (5) as there are reference colour and where each reference colour is depicted in at least one of the zones, d) placing the template adjacent the sample colour so that the sample colour and the reference colours on the template are all visible, e) sensing the sample colour and the reference colours with quantitative colour sensing equipment (6) under conditions which are not standard and obtaining non-standard parameters for both the sample colour and for the reference colours which non-standard parameters exist in a non-standard colour space, f) expressing the non-standard and standard definitions in parameters of a common type if the are not already expressed in parameters of a common type, g) selecting a near reference colour being a reference colour which is near to the sample colour in the non-standard colour space, h) providing on th template a plurality of groups of at least three reference colours wherein each colour in a group has a similar standard hue and which under standard conditions differs from other colours in the group in at least one of lightness and chroma, i) selecting at least one couple of other reference colours from the group which contains a near reference colour and using a couple in combination with the near reference colour to serve as three corner colours which define at least one triangle in non-standard colour space, j) identifying any such triangle which encompasses the sample colour in non-standard colour space and selecting the smallest in area of these encompassing triangles if there is more than one, k) taking in turn each non-standard L, a and b value called $L_{ns}$, $a_{ns}$ and $b_{ns}$ respectively and the parameters called $P_{ns}$ relating to a corner colour and subtracting from each $P_{ns}$ the corresponding standard parameter $P_{sc}$ of the corner colour so as to obtain the difference $P_{ns}-P_{sc}$ called δP, or δL, .δa or δb, respectively, i) notionally creating a two-dimensional non-standard cartesian space defined by an axis which is non-standard chroma which will be called $C_{ns}$ and an axis which is non-standard lightness and which is called $L_{ns}$ and is orthogonal to the $C_{ns}$ axis, m) notionally plotting for each corner colour is $C_{ns}$ and its δL in the cartesian space so as to create a further triangle, n) notionally converting the cartesian space into three dimensional space by adding a third orthogonal axis which is a δL axis, o) plotting the appropriate δL to each $L_{ns}$ to create three points which define a plane in the pace which is almost always inclined to the triangle created in step m), p) notionally plotting the non-standard chroma $C_{ns}$ of the sample colour and its lightness value $L_{sns}$ in the cartesian space of step l), q) determining the distance called $.\delta L_s$ from the point plotted in step p) to the plane in a direction parallel to the δL axis and r) twice repeating steps m) to q), using in the first repetition "δa" parameters instead of the "δL" parameters and in the second repetition "δb" parameters instead of the "δL" parameters whereby the numerical differences $L_{sns}-\delta L_s$, $a_{sns}-\delta a_s$, and $b_{sns}-\delta b_s$, convert the non-standard parameters of the sample colour to approximate standard parameters which together create an approximate standard colour definition for the sample colour.

3. A method according to claim 1 or claim 2 wherein the template is provided with from 50 to 300 test colours.

4. A method according to claim 1 or claim 2 wherein the colour sensing equipment includes a digital camera.

* * * * *